(12) United States Patent
Ogino et al.

(10) Patent No.: US 8,786,768 B2
(45) Date of Patent: Jul. 22, 2014

(54) IMAGE CAPTURING DEVICE

(75) Inventors: Masaki Ogino, Tokyo (JP); Yosuke Nagayama, Tokyo (JP); Susumu Kamiya, Kawasaki (JP); Akira Suzuki, Fuchu (JP); Tomoyasu Kurokawa, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 288 days.

(21) Appl. No.: 13/333,200

(22) Filed: Dec. 21, 2011

(65) Prior Publication Data

US 2012/0169913 A1 Jul. 5, 2012

(30) Foreign Application Priority Data

Dec. 21, 2010 (JP) ................................ 2010-284006
Dec. 24, 2010 (JP) ................................ 2010-287339
Dec. 27, 2010 (JP) ................................ 2010-289755

(51) Int. Cl.
*H04N 5/225* (2006.01)
*H04N 5/222* (2006.01)

(52) U.S. Cl.
USPC ..................................... 348/373; 348/333.06

(58) Field of Classification Search
USPC ............................................ 348/373, 333.06
See application file for complete search history.

(56) References Cited

U.S. PATENT DOCUMENTS

| | | | |
|---|---|---|---|
| 5,903,706 A | 5/1999 | Wakabayashi et al. | |
| 7,440,024 B2 | 10/2008 | Yamakose | |
| 7,483,076 B2 | 1/2009 | Sakai | |
| D636,423 S | 4/2011 | Ogino et al. | |
| 2005/0134717 A1* | 6/2005 | Misawa | 348/333.06 |
| 2011/0148608 A1* | 6/2011 | Grant et al. | 340/407.2 |

FOREIGN PATENT DOCUMENTS

| | | |
|---|---|---|
| JP | 5-173668 A | 7/1993 |
| JP | 8-065566 A | 3/1996 |
| JP | 9-135377 A | 5/1997 |
| JP | 2002-204296 A | 7/2002 |
| JP | 2003-163824 A | 6/2003 |

(Continued)

OTHER PUBLICATIONS

Japanese Office Action dated Jun. 12, 2012 (and English translation thereof) in counterpart Japanese Application No. 2010-284006.

(Continued)

*Primary Examiner* — Twyler Haskins
*Assistant Examiner* — Quang Le
(74) *Attorney, Agent, or Firm* — Holtz Holtz Goodman & Chick PC

(57) ABSTRACT

An image capturing device 100 includes three blocks, that is, a lens block 1 having an imaging lens 4, a display block 2, and a frame block 3. The display block 2 has a display unit 5 which performs display using a liquid crystal, a transparent touch screen 63 with which the display unit 5 is covered, a shutter button 61 which is disposed adjacent to the display unit 5, and a power button 62. The frame block 3 has a generally U-shaped frame form and surrounds the circumferences of the lens block 1 and the display block 2. Each of the display block 2 and the frame block 3 is coupled to the lens block 1 rotatably via a biaxial hinge unit. Especially, the display block 2 and the frame block 3 are coupled to the lens block 1 rotatably via a first hinge and second hinges.

11 Claims, 15 Drawing Sheets

(56) References Cited

FOREIGN PATENT DOCUMENTS

| | | |
|---|---|---|
| JP | 2003-188953 A | 7/2003 |
| JP | 2004-254222 A | 9/2004 |
| JP | 2004-274096 A | 9/2004 |
| JP | 2004-282604 A | 10/2004 |
| JP | 2005-031235 A | 2/2005 |
| JP | 2005-086476 A | 3/2005 |
| JP | 2005-986476 A | 3/2005 |
| JP | 2005-159741 A | 6/2005 |
| JP | 2005-229538 A | 8/2005 |
| JP | 2005-300671 A | 10/2005 |
| JP | 2005-300960 A | 10/2005 |
| JP | 2005-303390 A | 10/2005 |
| JP | 2005-323188 A | 11/2005 |
| JP | 2008-103835 A | 5/2008 |
| JP | 2010-191270 A | 9/2010 |

OTHER PUBLICATIONS

Japanese Office Action dated Jun. 6, 2012 (and English translation thereof) in counterpart Japanese Application No. 2010-289755.

Japanese Office Action dated Jun. 19, 2012 (and English translation thereof) in counterpart Japanese Application No. 2010-287339.

Japanese Office Action dated Jun. 12, 2012 and English translation thereof in counterpart Japanese Application No. 2010-284006.

Japanese Office Action dated Oct. 15, 2013 (and English translation thereof) in counterpart Japanese Application No. 2012-236419.

* cited by examiner

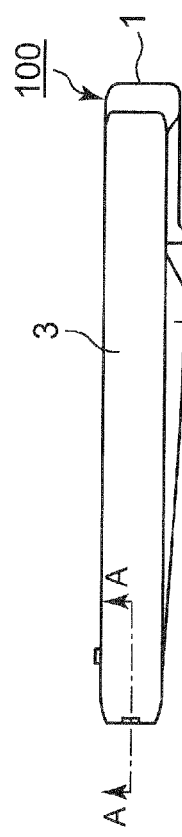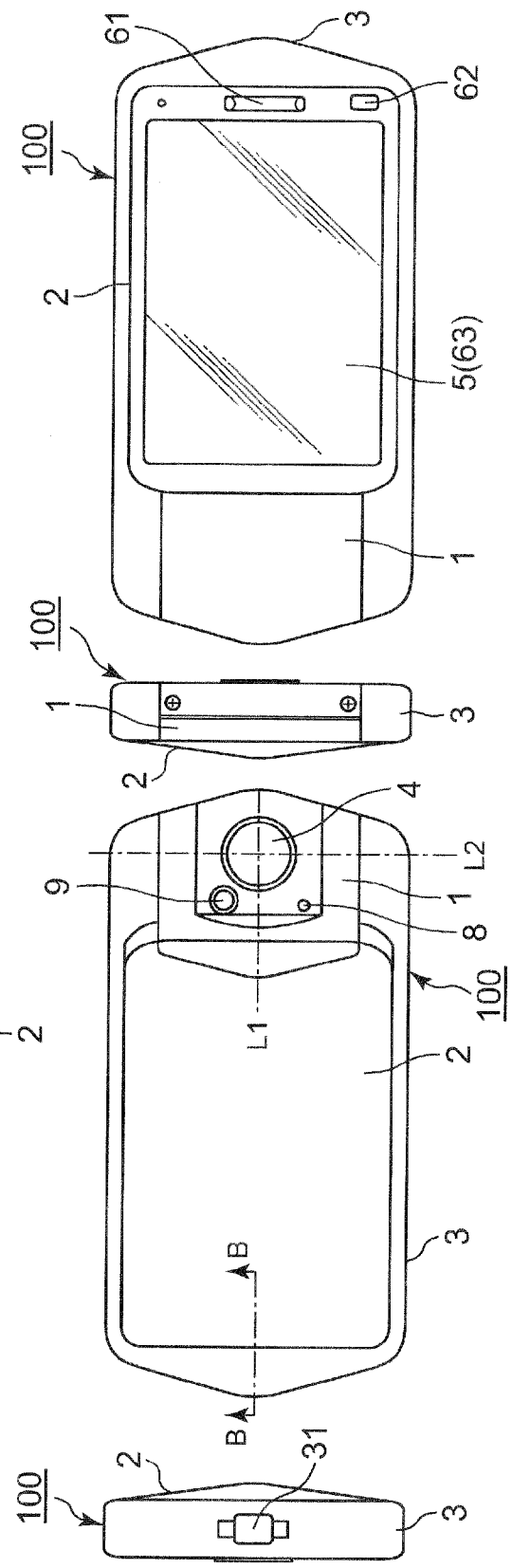

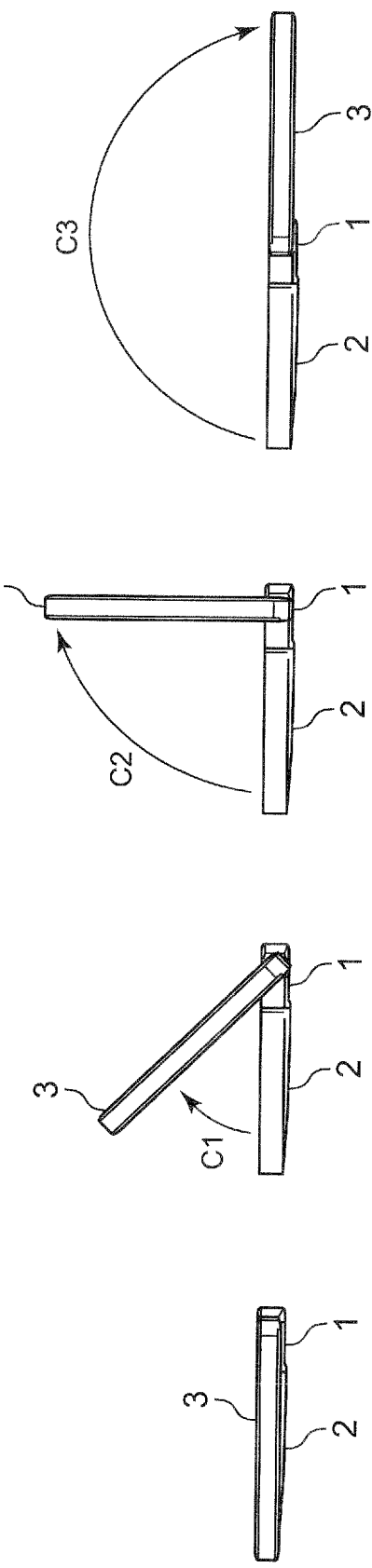

FIG. 15A
FIG. 15B
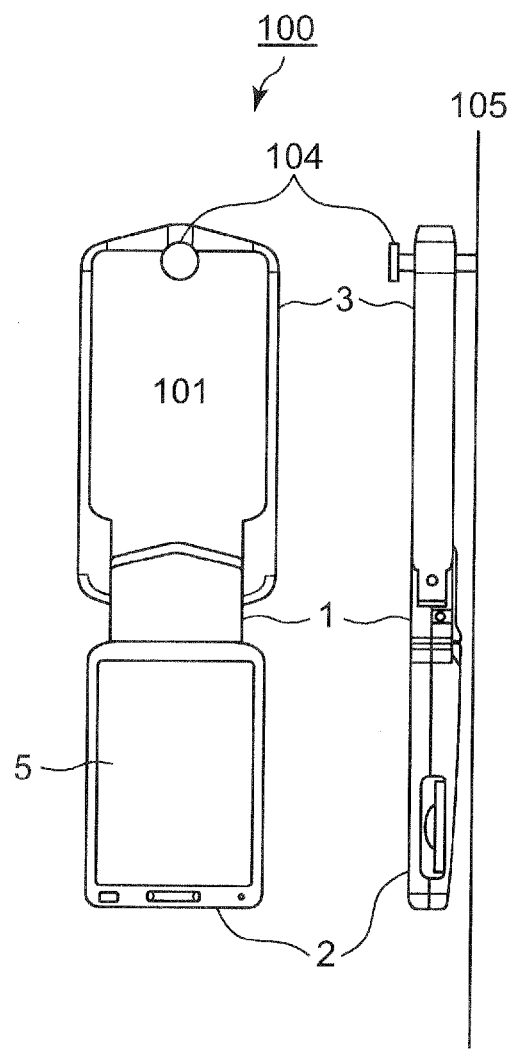
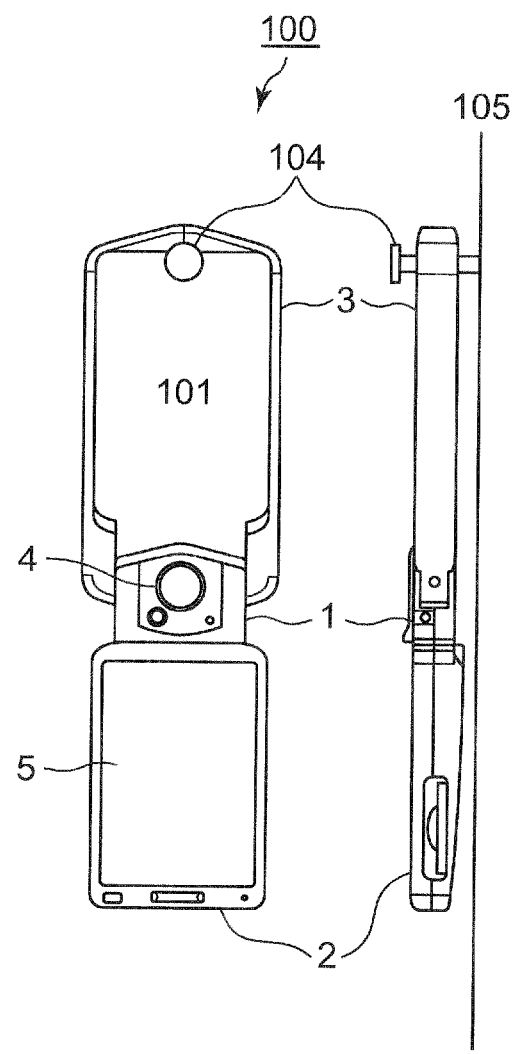

IMAGE CAPTURING DEVICE

CROSS-REFERENCE TO RELATED APPLICATION

This application claims priority from Japanese Patent Applications No. 2010-284006, filed on Dec. 21, 2010, No. 2010-287339, filed on Dec. 24, 2010, and No. 2010-289755, filed on Dec. 27, 2010, the entire contents of which are hereby incorporated by reference.

BACKGROUND OF THE INVENTION

1. Technical Field

Embodiments described herein relate to an image capturing device.

2. Description of the Related Art

JP-A-2010-191270 in FIG. 6 discloses a camera that includes: a main body block; a display block which is rotatable with respect to the main body block; and an operation unit which can be attached to and detached from the main body block. This camera has a hinge which allows the display block to rotate about a rotation axis that is parallel with a shorter sideline of the back surface of the main block. As a result, the appearance of the camera may be impaired very much depending on the rotation angle of the hinge, that is, the positional relationship between the display block and the main body block.

For example, it is conceivable to provide the display block with a shutter button. However, in this case, when the butter button is pushed, the display block may move because the hinge's ability to support the display block is insufficient for the pushing external force.

SUMMARY OF THE INVENTION

According to one or more illustrative aspects of the present invention, there is provided an image capturing device. The device includes: a first block comprising an imaging unit configured to capture an image of on object; a second block coupled rotatably to the first block; a third block formed to surround the first block and the second block and being coupled rotatably to the first block; and a latch configured to hold the second block such that the second block is fixed relative to the third block.

Other aspects and advantages of the present invention will be apparent from the following description, the drawings and the claims.

BRIEF DESCRIPTION OF THE DRAWINGS

FIG. 1A shows an appearance, as viewed from the front side, of an image capturing device according to an embodiment of the present invention;

FIG. 1B shows an appearance, as viewed from the left side, of the image capturing device according to the embodiment;

FIG. 1C shows an appearance, as viewed from the right side, of the image capturing device according to the embodiment;

FIG. 1D shows an appearance, as viewed from above, of the image capturing device according to the embodiment;

FIG. 1E shows an appearance, as viewed from the back side, of the image capturing device according to the embodiment;

FIG. 12A is a top view showing a state that the frame block is not rotated in a first embodiment;

FIG. 12B is a top view showing a state that the frame block is rotated by an angle C1 (about 45°) in the first embodiment;

FIG. 12C is a top view showing a state that the frame block is rotated by an angle C2 (about 90°) in the first embodiment;

FIG. 12D is a top view showing a state that the frame block is rotated by an angle C3 (about 180°) in the first embodiment;

FIG. 15A includes views, as viewed from the front side and one side, respectively, showing a state that the image capturing device is suspended from a hook of a wall with the shooting direction directed to the wall in the second embodiment;

FIG. 15B includes views, as viewed from the front side and one side, respectively, showing a state that the image capturing device is suspended from the hook of the wall with the shooting direction directed to the side opposite to the wall in the second embodiment.

DETAILED DESCRIPTION OF EXEMPLARY EMBODIMENTS

Figure 2:
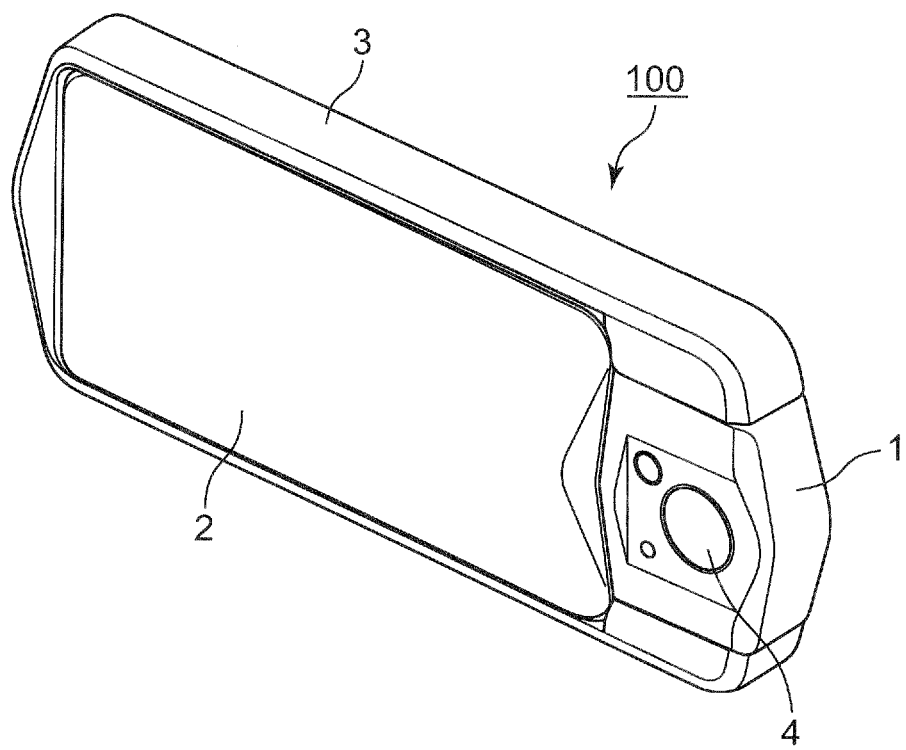
FIG. 2 is a perspective view of the image capturing device according to the embodiment.

An image capturing device according to an embodiment of the present invention will be hereinafter described in detail with reference to the drawings.

FIGS. 1A-1E and FIG. 2 show an image capturing device 100 according to the embodiment of the invention. Reference numeral 1 denotes a lens block; 2, a display block; 3, a frame block; 4, an imaging lens; 5, a display unit; 61, a shutter button; 8, a microphone; and 9, an LED.

As shown in these drawings, the image capturing device 100 is composed of three blocks, that is, a lens block 1 having the imaging lens 4, the display block 2, and the frame block 3. The display block 2 has the display unit 5 which performs display using a liquid crystal, a transparent touch screen 63 with which the display unit 5 is covered, the shutter button 61 which is disposed adjacent to the display unit 5, and a power button 62. The frame block 3 has a generally U-shaped frame form and surrounds the circumferences of the lens block 1 and the display block 2.

Each of the display block 2 and the frame block 3 is coupled to the lens block 1 rotatably via a biaxial hinge unit. More specifically, the display block 2 and the frame block 3 are coupled to the lens block 1 rotatably via a first hinge and second hinges, respectively.

Figure 3:
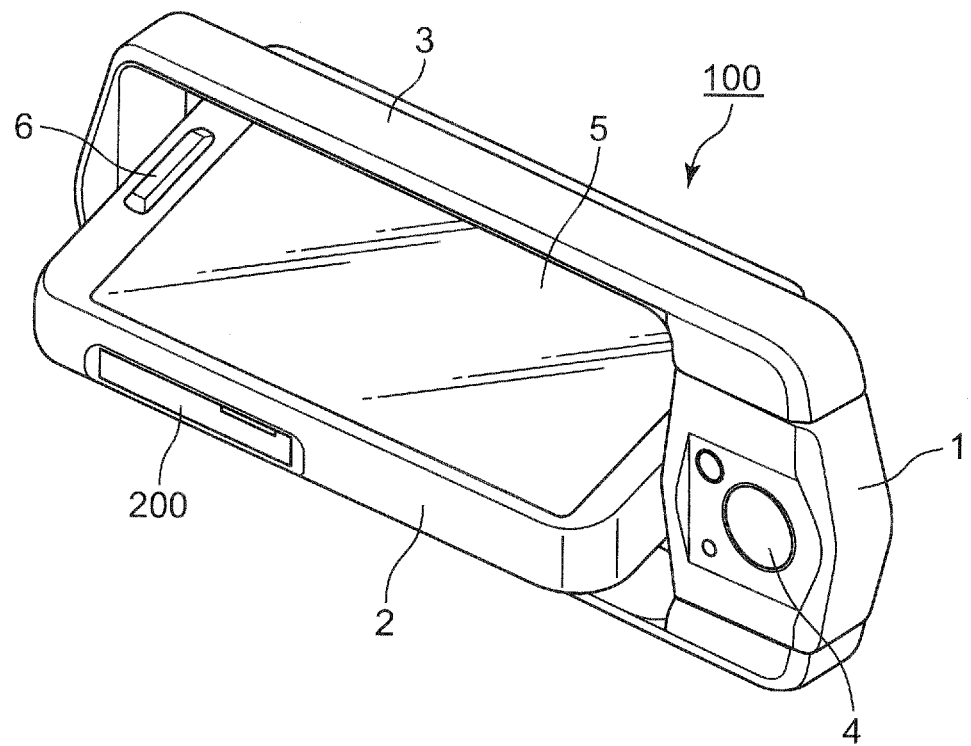
FIG. 3 is a perspective view of the image capturing device according to the embodiment in a state that a display block is rotated by 90°.
Figure 4:
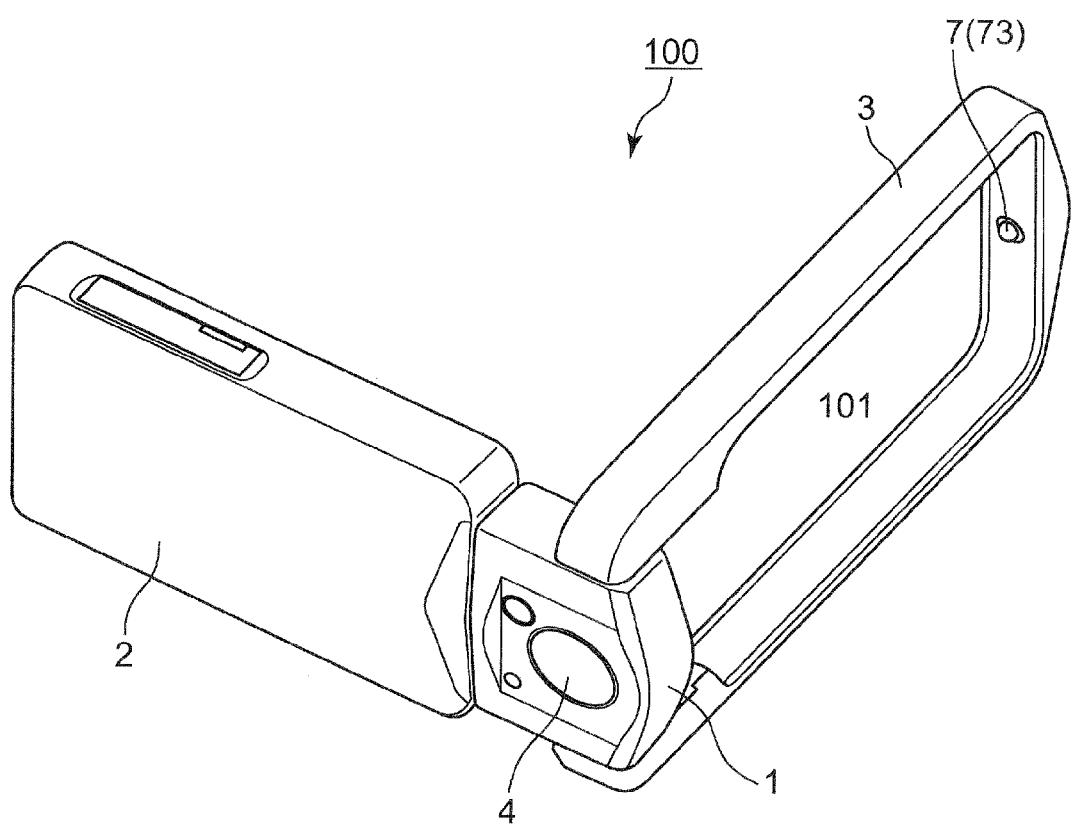
FIG. 4 is a perspective view of the image capturing device according to the embodiment in a state that a frame block is rotated by 90°.

As shown in FIG. 1A, the biaxial hinge unit is designed in such a manner that a rotation axis L1 of the first hinge which couples the display block 2 to the lens block 1 and a rotation axis L2 of the second hinges which couple the frame block 3 to the lens block 1 are perpendicular to each other. Therefore, as shown in FIG. 3, the display block 2 is rotated with respect to the lens block 1 about the rotation axis L1 of the first hinge. As shown in FIG. 4, the frame block 2 is rotated with respect to the lens block 1 about the rotation axis L2 of the second hinges to leave a space 101.

Figure 16:
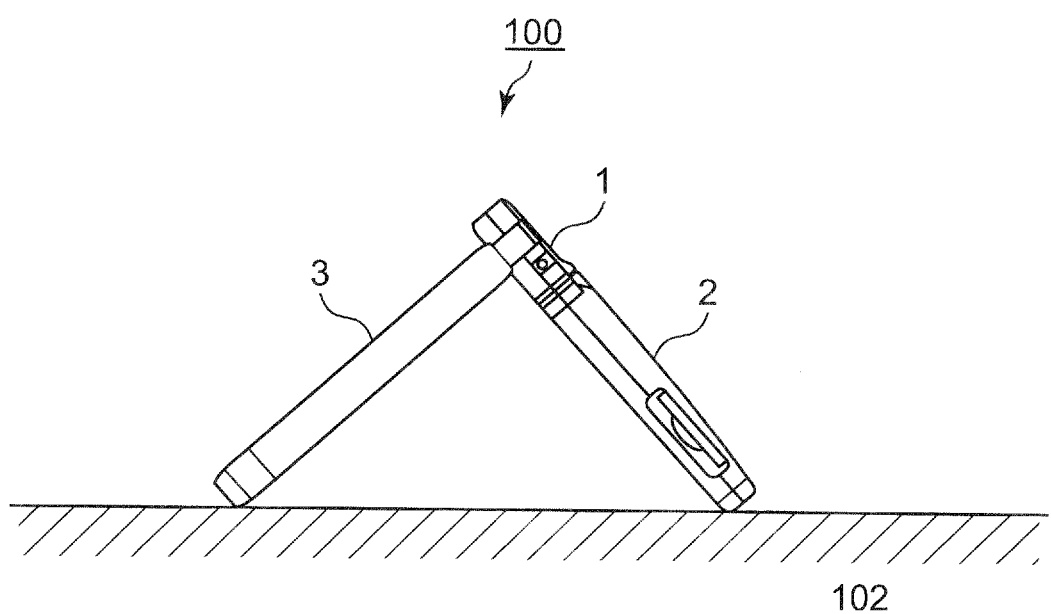
FIG. 16 shows a state that the image capturing device is erected like a tripod stand by rotating the frame block.

The frame block 3 can be rotated by 270°. Therefore, by changing the angle of the frame block 3 when the image capturing device 100 is used, shooting can be performed with the image capturing device 100 kept in various postures. For example, shooting can be performed with the image capturing device 100 erected like a tripod stand by opening the frame block 3 as shown in FIG. 16. Shooting can be performed with the frame block 3 hooked on a wall surface or the like (see FIG. 15B) utilizing the fact that the frame block 3 has a generally U-shaped frame form. Shooting can also be performed by holding the image capturing device 100 as if it were a camcorder by gripping the frame block 3 (see FIG. 4).

The frame block 3 is formed with a strap holder 31 which is made of an elastic resin and allows a strap to pass through it. The strap holder 31 has a function of preventing the frame block 3 from slipping in a state that the image capturing device 100 is erected like a tripod stand on a base 102 as shown in FIG. 16.

In the state shown in FIG. 2, the user can perform shooting while holding the image capturing device 100 in an ordinary manner. If the user manipulates the shutter button 61 or the touch screen 63 in performing shooting with the image capturing device 100 in the state of FIG. 2, force of pushing the display block 2 or the screen of the display unit 5 tends to occur. To prevent the display block 2 from being disengaged from the frame block 3 by such pushing force, the frame block 3 is provided with a latch 7. The latch 7 is disposed on the extension of the rotation axis L1 of the first hinge on the side opposite to the lens block 1 and prevents the display block 2 from wobbling with respect to the frame block 3.

Figure 5:
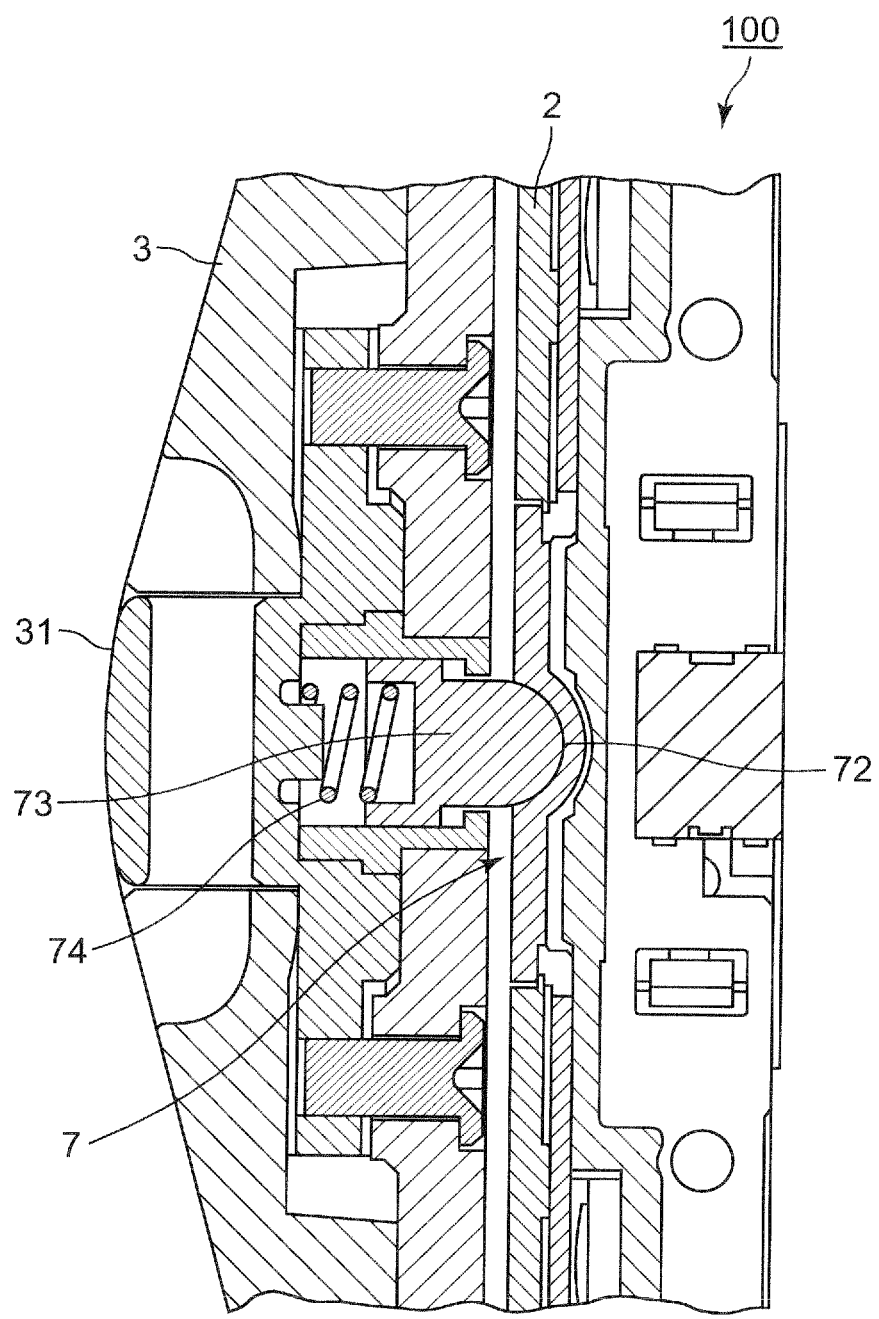
FIG. 5 is an enlarged sectional view taken along line A-A in FIG. 1D.
Figure 6:
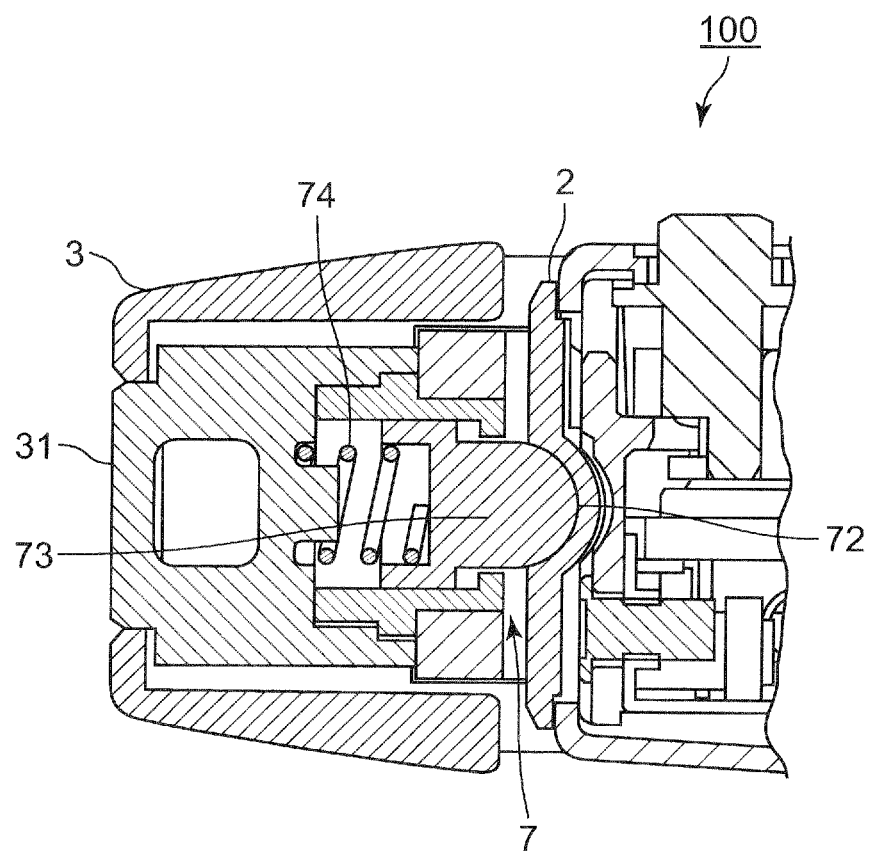
FIG. 6 is an enlarged sectional view taken along line B-B in FIG. 1A.

As shown in FIGS. 5 and 6, the latch 7 is composed of a recess 72 formed in the display block 2 and a pin 73 and a spring 74 provided in the frame block 3 on the side opposite to the strap holder 31.

More specifically, the end wall, opposite to the lens block 1, of the display block 2 is formed with a hemispherical recess 72 at the center in such a manner that the center of the recess 72 is located on the extension of the rotation axis L1 of the first hinge.

The pin 73 having a hemispherical tip portion is incorporated in a central, inside portion of the side rim portion, located on the side opposite to the lens block 1, of the frame block 3 so as to project and retract in such a manner that the center of the pin 73 is located on the extension of the rotation axis L1 of the first hinge. The spring 74 is also incorporated in the side rim portion of the frame block 3 so as to urge the pin 73 in the projecting direction. The spring 74 is fixed to the strap holder 31 to be in pressure contact with the pin 73 with such pressure that resulting locking strength surpasses operation force to be exerted on the shutter button 61.

The above-configured latch 7 can maintain a lock state that the pin 73 being urged by the spring 74 projects and is engaged with the recess 72.

Since the display block 2 is kept engaged with the frame block 1 by means of the latch 7 on the side opposite to the lens block 1, the display block 2 is prevented from wobbling and shooting can be performed properly even if the shutter button 61 is pushed with the image capturing device 100 being in the ordinary posture shown in FIGS. 1A-1E. The display block 2 is prevented from wobbling even if the display block 2 or the screen of the display unit 5 is pushed by a finger to manipulate the image capturing device 100.

When the display block 2 is rotated with respect to the lens block 1 about the rotation axis L1 of the first hinge (see FIG. 3), the display block 2 is kept stable with a small clearance between the display block 2 and the frame block 3 because the lock state that the pin 73 is engaged with the recess 72 is maintained on the extension of the rotation axis L1 of the first hinge. Thus, the image capturing device 100 which is composed of the three blocks 1-3 exhibits a good appearance.

Figure 7:
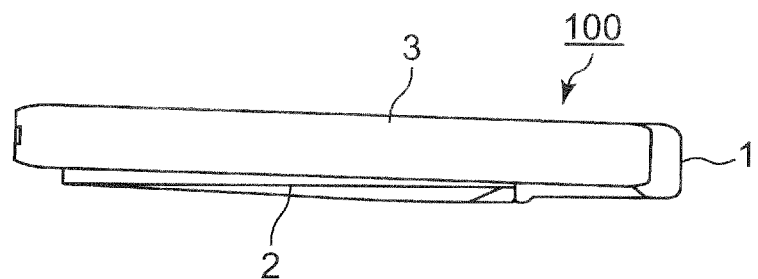
FIG. 7 is a top view showing a state that the display block has been moved slightly from the state of FIG. 1D.
Figure 8:
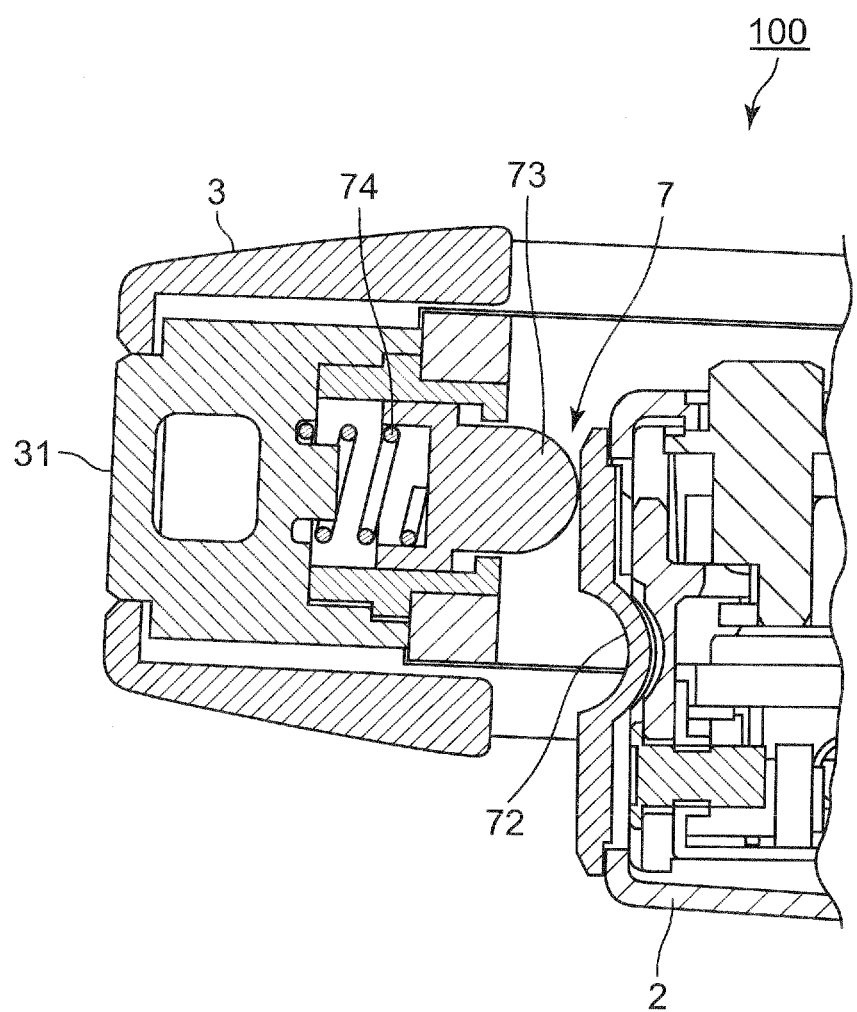
FIG. 8 is an enlarged sectional view taken along line B-B which corresponds to FIG. 7.
Figure 9:
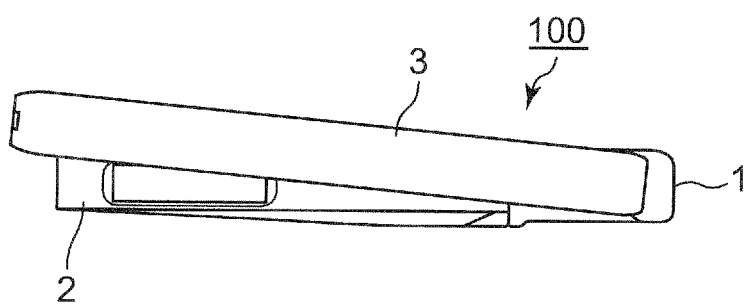
FIG. 9 is a top view showing a state that the display block has been moved further from the state of FIG. 7.
Figure 10:
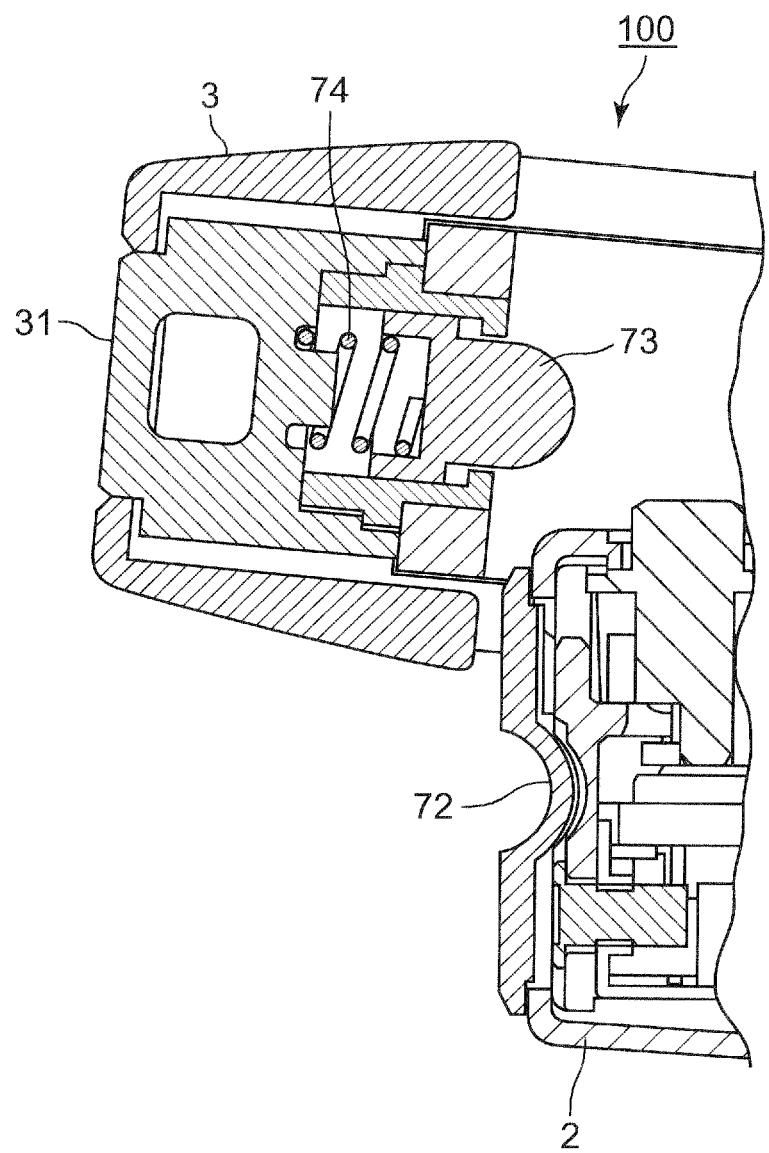
FIG. 10 is an enlarged sectional view taken along line B-B which corresponds to FIG. 9.

To rotate the frame block 3 with respect to the combination of the lens block 1 and the display block 2 about the rotation axis L2 of the second hinges, the user applies force that is stronger than the shutter operation force to the display block 2 or the frame block 3, whereby the pin 73 is disengaged from the recess 72 against the urging force of the spring 74 (see FIGS. 7 and 8) and the locking of the latch 7 is canceled (see FIGS. 9 and 10). An opposite procedure is followed to re-establish a lock state from a state that the latch 7 is unlocked.

In the above embodiment, the pin 73 is provided in the display block 2 and the recess 72 is formed in the frame block 3. Conversely, an image capturing device may be configured in such a manner that the recess 72 is formed in the display block 2 and the pin 73 is provided in the frame block 3.

Instead of having the mechanical structure consisting of the pin 73 and the recess 72, the latch may have a structure that utilizes properties inherent to materials, such as a structure consisting of a magnetic member and a metal member.

First Embodiment

Figure 11:
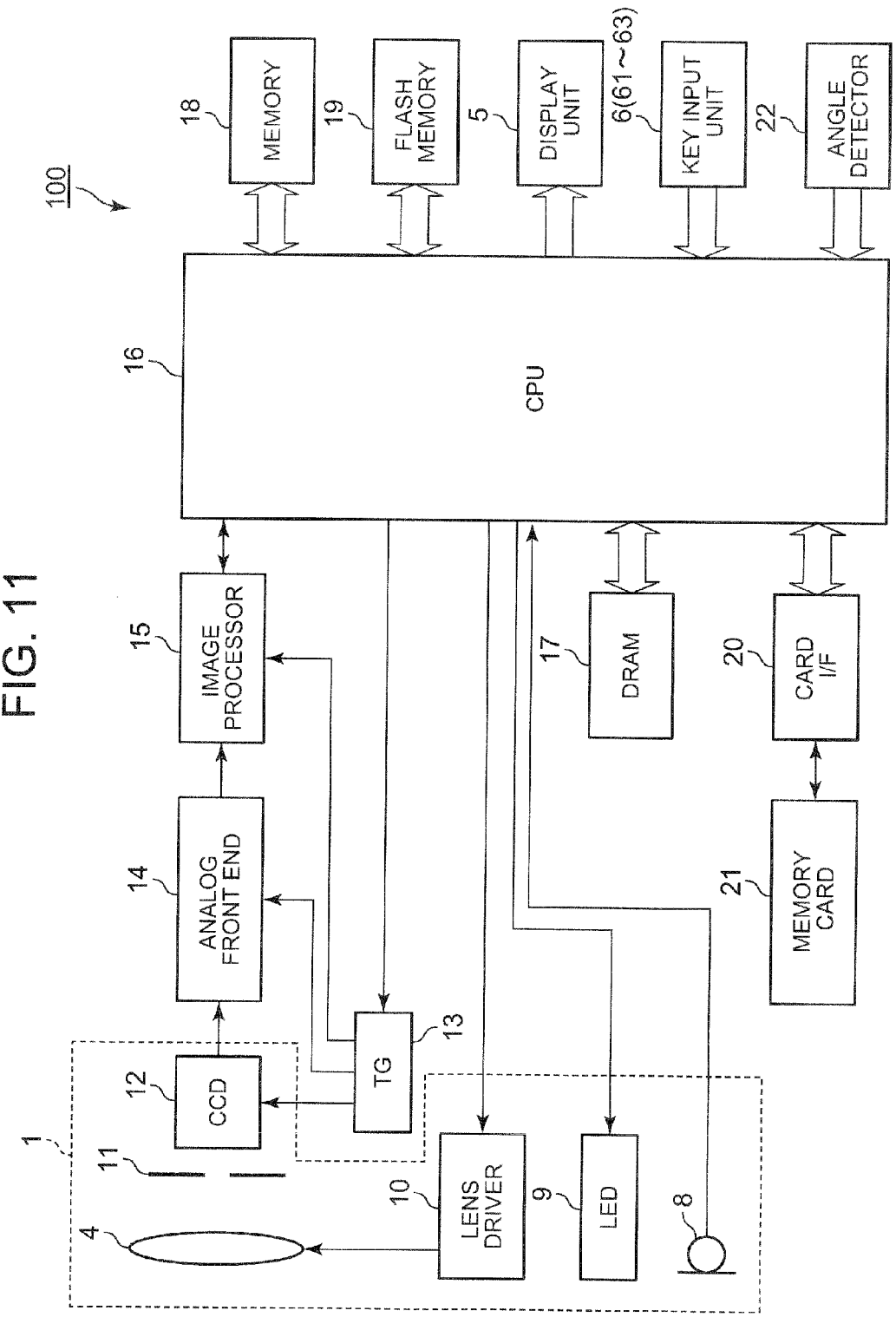
FIG. 11 is a block diagram showing a functional configuration of the image capturing device.

FIG. 11 is a block diagram showing a functional configuration of the image capturing device 100 according to the invention. The appearances and the mechanisms/structures of the image capturing device 100 have already been described with reference to FIGS. 1A-1E to FIG. 10 etc.

As shown in FIG. 11, in addition to the components described above with reference to FIGS. 1A-1E, the image capturing device 100 is equipped with a lens driver 10, a shutter/stop 11, a CCD 12, a TG (timing generator) 13, an analog front end 14, an image processor 15, a CPU 16, a DRAM 17, a memory 18, a flash memory 19, a key input unit 6 (shutter button 61, a power button 62, and a touch screen 63), a card I/F 20, a memory card 21, and an angle detector 22.

The imaging lens 4 includes a focus lens, a zoom lens, etc., and the lens driver 10 is connected to it. The lens driver 10 is composed of respective motors for moving the focus lens and the zoom lens of the image lens 4 in the optical axis direction and a focus motor driver and a zoom motor driver for driving the focus motor and the zoom motor according to control signals supplied from the CPU 16.

The shutter/stop 11 includes a drive circuit (not shown), and is operated by the drive circuit according to a control signal supplied from the CPU 16. The shutter/stop 11 controls the amount of light that comes from the imaging lens 4 and is to shine on the CCD (imaging device) 12. The CCD 12 converts an optical image of a subject formed by the imaging lens 4 and the shutter/stop 11 into an electrical signal and outputs the electrical signal to the analog front end 14 as an imaging signal. The CCD 12 is driven according to a timing signal having a prescribed frequency that is generated by the TG 13.

At least the imaging lens 4, the lens driver 10, the shutter/stop 11, the CCD 12, the microphone 8, and the LED 9 are concentrated in the lens block 1.

The analog front end 14 is composed of a CDS (correlated double sampling) circuit for performing correlated double sampling on an imaging signal that is output from the CCD 12 and holding a resulting imaging signal, an AGC (automatic gain control) circuit for performing automatic gain control on the sampled imaging signal, and an A/D conversion circuit for converting an analog gain-adjusted imaging signal into a digital signal. The analog front end 14 is driven according to a timing signal having a prescribed frequency that is generated by the TG 13. An imaging signal generated by the CCD 12 is thus converted into a digital signal, which is supplied to the image processor 15.

The image processor 15 performs such image processing as pixel interpolation, γ correction, generation of a luminance signal and a color difference signal, white balance adjustment, and exposure correction on image data supplied from the analog front end 14. Furthermore, the image processor 15 compresses or expands the image data according to JPEG, M-JPEG, or MPEG, combines image data of plural shot images, and performs other processing. The image processor 15 is driven by a timing signal having a prescribed frequency that is generated by the TG 13.

The microphone 8 picks up a sound that comes in the optical axis direction while a moving image, for example, is being taken. The LED 9 is lit to provide illumination for compensating for a light quantity shortage at the time of macro shooting, for example.

The CPU 16 is a one-chip microcomputer for controlling the individual units of the image capturing device 100. In the embodiment, in particular, when the frame block 3 and the display block 2 are rotated with respect to each other and thereby opened at a prescribed angle (described later), the CPU 16 automatically sets the shooting conditions and controls the operations of the individual units so as to establish a macro shooting mode (close-up shooting mode).

Furthermore, when the shooting direction which is the direction going away from the imaging lens 4 of the lens block 1 toward the front side and the display direction of the display unit 5 of the display block 2 are opposite to each other, the CPU 16 performs controls so that an image taken in the macro shooting mode (close-up shooting mode) is displayed on the display unit 5.

The DRAM 17 is used as a buffer memory for temporarily storing image data that is generated by the CCD 12 and supplied to the CPU 16, as well as a working memory of the CPU 16.

The memory 18 is stored with programs and data that are necessary for control of the individual units of the image capturing device 100. The CPU 16 operates according to those programs. The flash memory 19 and the memory card 21 are recording media for storing image data generated by the CCD 12 and other information.

The display unit 5 includes a color LCD and drive circuits therefor. In a shooting standby state, the display unit 5 displays a through-the-lens image of a subject taken by the CCD 12. When a recorded image is reproduced, the display unit 5 displays a recorded image that is read from the flash memory 19 or the memory card 21 and expanded.

The key input unit 6 includes the shutter button 61, the power button 62, and the touch screen 63 configured to detect operations such as zooming, mode switching, setting, and selecting and outputs an operation signal corresponding to a user key operation to the CPU 16. The memory card 21 is inserted, in a detachable manner, in a card slot 200 (see FIG. 3) which is connected to the card I/F 20.

The angle detector 22, which is a mechanical, optical, or electromagnetic sensor, detects a rotation angle of rotation about the rotation axis L1 of the first hinge and a rotation angle of rotation about the rotation axis L2 of the second hinges.

FIGS. 12A-12D are top views showing various postures that the image capturing device 100 takes as the frame block 3 is rotated. When the angle of the frame block 3 with respect to the display block 2 is 0° (see FIG. 12A), the frame block 3, the lens block 1, and the display block 2 are approximately in line and the image capturing device 100 is approximately flat. The frame block 3 can be rotated so as to form angles C1 (about 45°; see FIG. 12B), C2 (about 90°; see FIG. 12C), and C3 (about 180°; see FIG. 12D) with the display block 2.

Figure 13A:
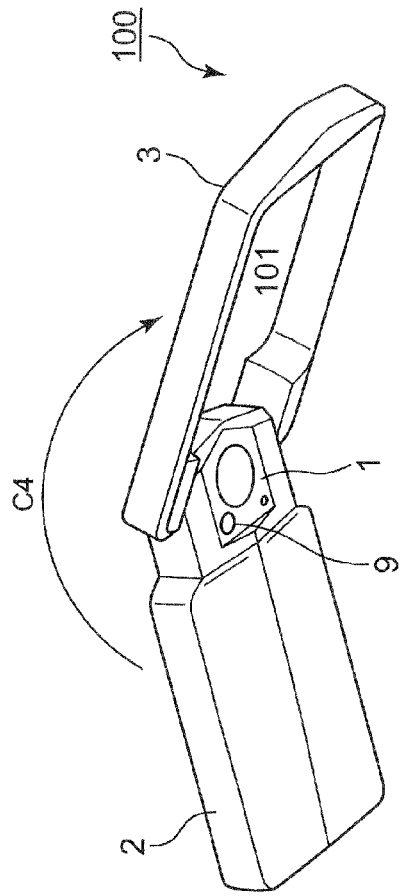
FIG. 13A is a perspective view of the image capturing device in a macro shooting state in the first embodiment.
Figure 13B:
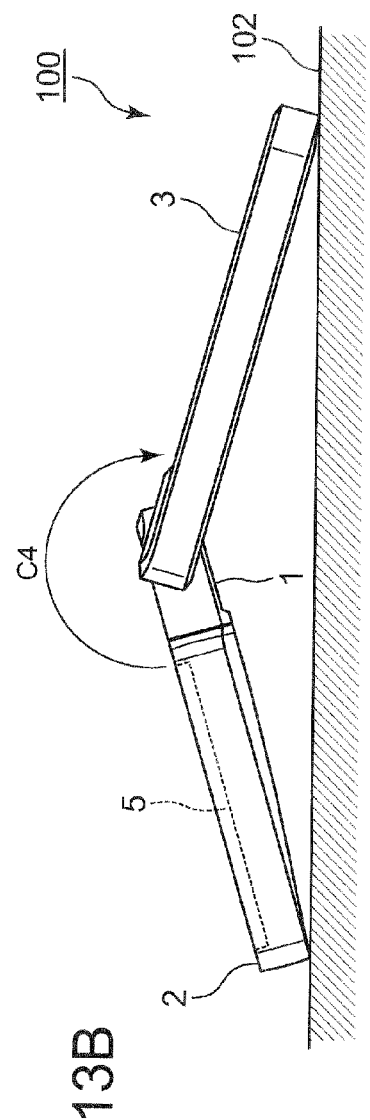
FIG. 13B is a top view of the image capturing device in the macro shooting state in the first embodiment.
Figure 13C:
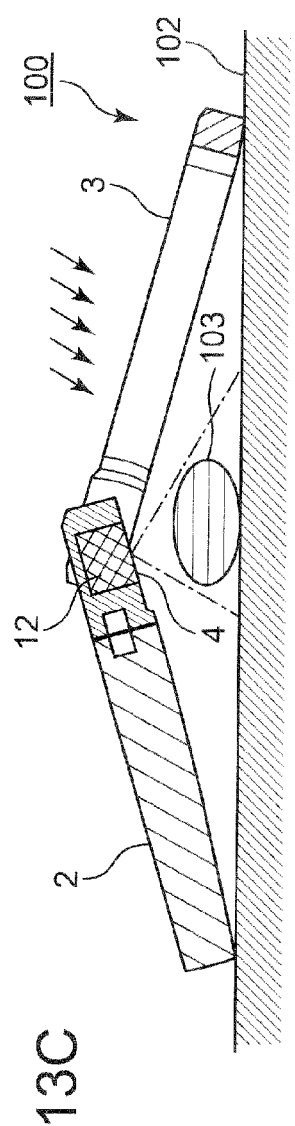
FIG. 13C is a sectional view of the image capturing device in the macro shooting state in the first embodiment.

FIGS. 13A-13C are a perspective view, a top view, and a sectional view, respectively, of a macro shooting state of the image capturing device 100 according to the embodiment.

In the embodiment, the frame block 3 can be rotated further from the state of FIG. 12D so as to form an angle that is larger than 180° with the display block 2. When the user rotates the frame block 3 to a prescribed angle that is larger than 180° with respect to the display block 2 (see FIG. 13A), the rotation angle about the rotation axis L2 of the second hinges is detected by the angle detector 22 and the CPU 16 switches the shooting mode to the macro shooting mode. The user sets the image capturing device 100 on a desk 102, for example, in a stable manner (see FIG. 13B). The rotation function of the frame block 3 is provided with a notch mechanism so that the frame block 3 is half fixed (fixing is canceled if prescribed force is applied to the frame block 3) at plural prescribed angles.

In the state of FIG. 13B, the screen of the display unit 5 faces the user side and the CCD 12 (imaging lens 4) of the lens block 1 faces the desk 102 (i.e., it is directed downward in FIG. 13B). An appropriate space is formed between the lens block 1 and the desk 102.

A subject 103 that is placed in the space is shot as shown in FIG. 13C. At this time, the shooting mode has automatically been switched to the macro shooting mode and optimum conditions for close-up shooting have been set. Therefore, the user can perform shooting in an optimum manner without the need for making any special setting operations.

Furthermore, at this time, an approximate angle formed by the lens block 1 and the display block 2 (i.e., an approximate rotation angle of the rotation axis L1 of the first hinge) is detected by the angle detector 22. An image being taken is displayed on the display unit 5 if it is determined that the shooting direction and the display direction are opposite to each other.

Since the frame block 3 of the image capturing device 100 has a generally U-shaped frame form, in the state of FIG. 13C a space 101 is formed inside to allow passage of external light (indicated by arrows). Thus, a sufficient light quantity for shooting can be obtained relatively easily.

However, insufficient exposure may occur depending on the shooting situation (e.g., casting of a shadow of another object), the LED 9 may be lit automatically or when a user operation is detected.

As described above, a subject can be shot without a blur by setting the image capturing device 100 being in the close-up shooting state on a placement surface so as to stride over the subject and performs shooting with the shooting direction of the image capturing device 100 directed to the subject.

According to the above-described embodiment, a subject can be shot without a blur because the image capturing device 100 can be set with the distance to the subject kept stable. Furthermore, switching can automatically be made to the macro shooting mode (or a particular shooting mode) when the frame block 3 has been rotated by the prescribed angle.

Second Embodiment

Next, a second embodiment will be described in detail. The appearances, the mechanisms/structures, and the functional configuration of the image capturing device 100 have already been described with reference to FIGS. 1A-1E to FIG. 11 etc.

Figure 14:
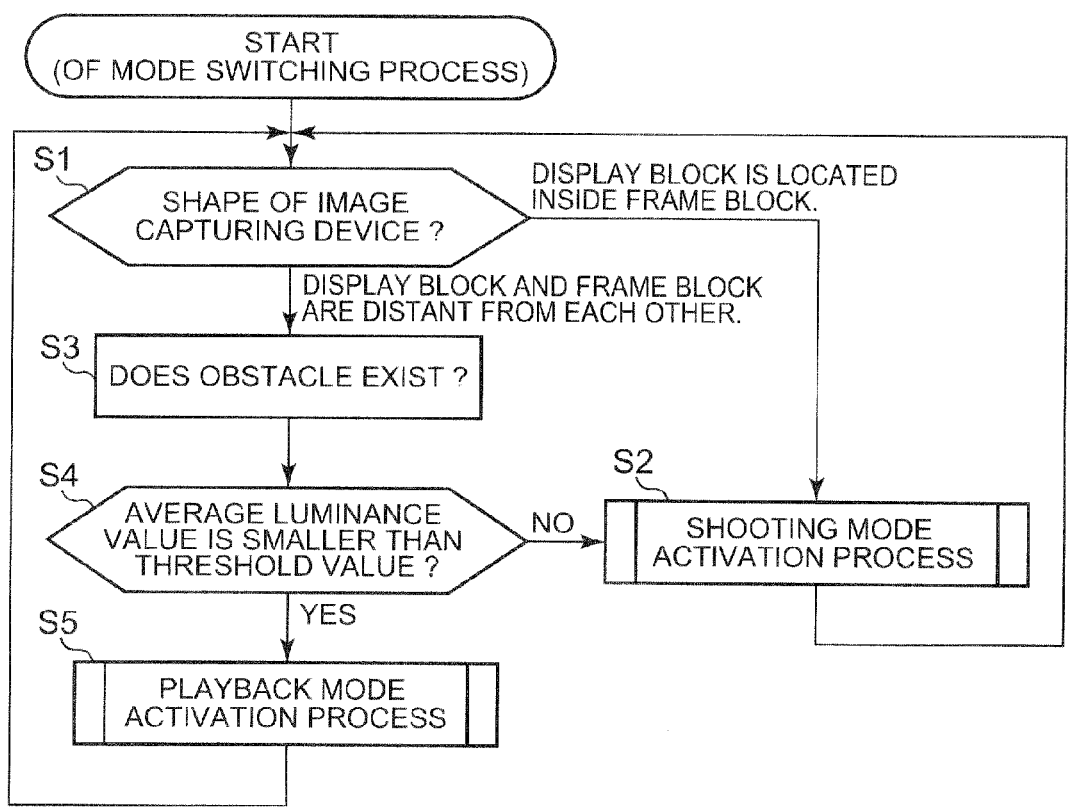
FIG. 14 is a flowchart of an example process according to a second embodiment.

FIG. 14 is a flowchart of an example process according to the second embodiment.

FIG. 15A shows a state that the frame block 3 of the image capturing device 100 has been rotated about the rotation axis L2 of the second hinges so as to move away from the display block 2, the frame block 3 is suspended from a hook 104, and the display block 2 is rotated about the rotation axis L1 of the first hinge so that the shooting direction of the imaging lens 4 of the lens block 1 is directed to an obstacle 105 and the display direction of the display unit 5 is directed to the side opposite to the obstacle 105.

FIG. 15B shows a state that the frame block 3 of the image capturing device 100 has been rotated about the rotation axis L2 of the second hinges so as to move away from the display block 2, the frame block 3 is suspended from the hook 104, and the display block 2 is rotated about the rotation axis L1 of the first hinge so that the shooting direction of the imaging lens 4 of the lens block 1 and the display direction of the display unit 5 are both directed to the side opposite to the obstacle 105.

As shown in FIG. 14, in a mode switching process of the image capturing device 100, first, at step S1, a shape of the image capturing device 100 (i.e., a positional relationship between the display block 2 and the frame block 3) is determined by using the angle detector 22. That is, it is determined whether the display block 2 and the frame block 3 are distant from each other as shown in FIG. 15A or 15B or the display block 2 is located inside the frame block 3.

If it is judged at step S1 that the display block 2 is located inside the frame block 3, at step S2 the CPU 16 activates a shooting mode. Upon completion of the shooting mode activation process (step S2), the CPU 16 returns to step S1.

If it is determined at step S1 that the display block 2 and the frame block 3 are distant from each other, at step S3 the CPU 16 judges whether or not an obstacle (e.g., wall surface) to shooting exists.

At step S4, the CPU 16 calculates an average of luminance values (hereinafter referred to as an average luminance value) of a two-dimensional image signal generated by the CCD 12 and determines whether the average value is smaller than a prescribed threshold value.

If it is determined at step S4 that the average value is not smaller than the prescribed threshold value, the CPU 16 moves to step S2, where it activates the shooting mode. Upon completion of the shooting mode activation process, the CPU 16 returns to step S1.

If it is determined at step S4 that the average value is smaller than the prescribed threshold value, at step S5 the CPU 16 activates a playback mode. Upon completion of the playback mode activation process, the CPU 16 returns to step S1.

As described above, according to the embodiment, switching between the shooting mode and the playback mode can be made automatically according to the shape of the image capturing device 100 and the average luminance value.

The present embodiment is not limited to the above embodiments, and various improvements and design changes may be made without departing from the spirit and scope of the invention.

For example, at step S3 of the mode switching process of FIG. 14, whether switching should made to the shooting mode or the playback mode is determined on the basis of an average luminance value of a two-dimensional image signal generated by the CCD 12 (by shooting an obstacle). Alternatively, a mode to which switching should be made may be determined by dividing a two-dimensional image signal generated by the CCD 12 into portions corresponding to plural regions and calculating a median or average of luminance vales of an arbitrary region.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. An image capturing device comprising:
 a first block comprising an imaging unit configured to capture an image of an object;
 a second block coupled rotatably to the first block;
 a third block formed to surround the first block and the second block and being coupled rotatably to the first block;
 a latch configured to hold the second block such that the second block is fixed relative to the third block;
 a first hinge which rotatably couples the second block to the first block; and
 a second hinge which rotatably couples the third block to the first block;
 wherein a rotation axis of the first hinge and a rotation axis of the second hinge are substantially perpendicular to each other, and wherein an optical axis of the imaging unit is substantially perpendicular to the rotation axes of the first and second hinges.

2. The device according to claim 1, wherein the third block is formed in a frame shape to surround a periphery of each of the first block and the second block.

3. The device according to claim 2, wherein the third block is configured so as not to face an imaging surface of the imaging unit.

4. The device according to claim 1, wherein the latch comprises:
 a recess formed in one of the second block and the third block; and
 a movable projection which is provided in the other of the second block and the third block and is configured to engage with and disengage from the recess.

5. The device according to claim 1, wherein the second block comprises a display.

6. The device according to claim 1, wherein the second block comprises a detector which detects a shutter operation.

7. The device according to claim 1, further comprising:
 a setting unit configured to set the imaging unit to one of a close-up shooting mode and an ordinary shooting mode;

a first determining unit configured to determine whether or not a shooting direction of the imaging unit is directed to the object when the third block is rotated about the rotation axis of the second hinge; and a controller configured to control the setting unit such that the imaging unit is set to the close-up shooting mode, when the first determining unit determines that the shooting direction of the imaging unit is directed to the object.

8. The device according to claim 7, further comprising:

an illumination unit configured to illuminate the object during shooting by the imaging unit, when the imaging unit is set to the close-up shooting mode.

9. The device according to claim 1, wherein the first block, the second block and the third block are configurable to be arranged in a straight line.

10. An image capturing device comprising:

a first block comprising an imaging unit configured to capture an image of an object;

a second block coupled rotatably to the first block, the second block comprising a display;

a third block formed to surround the first block and the second block and being coupled rotatably to the first block;

a latch configured to hold the second block such that the second block is fixed relative to the third block;

a first hinge which rotatably couples the second block to the first block;

a second hinge which rotatably couples the third block to the first block;

a setting unit configured to set the imaging unit to one of a close-up shooting mode and an ordinary shooting mode;

a first determining unit configured to determine whether or not a shooting direction of the imaging unit is directed to the object when the third block is rotated about the rotation axis of the second hinge;

a controller configured to control the setting unit such that the imaging unit is set to the close-up shooting mode, when the first determining unit determines that the shooting direction of the imaging unit is directed to the object;

a second determining unit configured to determine whether or not the shooting direction of the imaging unit is opposite to a display direction of the display when the second block is rotated about the rotation axis of the first hinge; and a display controller configured to control the display such that an image captured in the close-up shooting mode is displayed on the display, when the first determining unit determines that the shooting direction of the imaging unit is directed to the object to be captured, and the second determining unit determines that the shooting direction of the imaging unit is opposite to a display direction of the display;

wherein a rotation axis of the first hinge and a rotation axis of the second hinge are substantially perpendicular to each other.

11. An image capturing device comprising:

a first block comprising an imaging unit configured to capture an image of an object;

a second block coupled rotatably to the first block;

a third block formed to surround the first block and the second block and being coupled rotatably to the first block;

a latch configured to hold the second block such that the second block is fixed relative to the third block;

a first hinge which rotatably couples the second block to the first block;

a second hinge which rotatably couples the third block to the first block;

a first determining unit configured to determine whether or not a shooting direction of the imaging unit is directed to the object when the third block is rotated about the rotation axis of the second hinge;

a second determining unit configured to determine whether or not an obstacle exists on the shooting direction of the imaging unit, based on an image signal generated by the imaging unit; and a first mode switching controller configured to switch the imaging unit to a playback mode, when the first determining unit determines that the shooting direction of the imaging unit is directed to the object and the second determining unit determines that the obstacle exists on the shooting direction of the imaging unit;

wherein a rotation axis of the first hinge and a rotation axis of the second hinge are substantially perpendicular to each other.

* * * * *